(12) United States Patent
Lambertson (10) Patent No.: US 9,732,966 B2
(45) Date of Patent: Aug. 15, 2017

(54) MULTI-STAGE HOOD FILTER SYSTEM

(71) Applicant: Streivor, Inc., Hayward, CA (US)

(72) Inventor: Jeffrey S. Lambertson, Danville, CA (US)

(73) Assignee: STREIVOR, INC., Livermore, CA (US)

( * ) Notice: Subject to any disclaimer, the term of this patent is extended or adjusted under 35 U.S.C. 154(b) by 161 days.

(21) Appl. No.: 14/284,350

(22) Filed: May 21, 2014

(65) Prior Publication Data

US 2014/0250844 A1    Sep. 11, 2014

Related U.S. Application Data

(63) Continuation-in-part of application No. 13/363,128, filed on Jan. 31, 2012, now abandoned.

(60) Provisional application No. 61/438,226, filed on Jan. 31, 2011.

(51) Int. Cl.
*F24C 15/20* (2006.01)
*B01D 50/00* (2006.01)

(52) U.S. Cl.
CPC ........ *F24C 15/2035* (2013.01); *B01D 50/002* (2013.01)

(58) Field of Classification Search
CPC ... B01D 39/1615; B01D 50/002; F24C 15/20; F24C 15/2035
USPC ........... 55/332, 337, 486, DIG. 36, DIG. 31; 126/299 D, 299 E
See application file for complete search history.

(56) References Cited

U.S. PATENT DOCUMENTS

| | | | | |
|---|---|---|---|---|
| 2,862,437 A | * | 12/1958 | Smith | ................. F24C 15/2035 126/299 D |
| 3,357,763 A | * | 12/1967 | Toper | .................... F24F 1/0007 312/236 |
| 3,500,740 A | * | 3/1970 | Aubrey | ................... F24C 15/20 126/299 D |
| 3,618,659 A | * | 11/1971 | Rawal | ..................... F24F 3/044 165/104.34 |
| 4,089,327 A | | 5/1978 | Welsh | |
| 4,186,727 A | | 2/1980 | Kaufman et al. | |
| 4,200,087 A | * | 4/1980 | Welsh | ..................... F24C 15/20 126/299 R |
| 4,350,504 A | | 9/1982 | Diachuk | |

(Continued)

OTHER PUBLICATIONS

PCT/US2015/032018, "International Search Report and Written Opinion", Aug. 17, 2015, 10 pages.

(Continued)

*Primary Examiner* — Jacob T Minskey
*Assistant Examiner* — Minh-Chau Pham
(74) *Attorney, Agent, or Firm* — Kilpatrick Townsend & Stockton LLP (57) ABSTRACT

A filtration system for a ventilation hood includes a first filter and a second filter, operatively disposed in series. The first filter is configured to be mounted within the ventilation hood, and has an air inlet, an air outlet, and a grease outlet. The second filter includes a filter material with an upstream surface and a downstream surface, an upstream housing element abutting the upstream surface of the filter material, and a downstream housing element abutting the downstream surface of the filter material. The housing elements include openings, and hold the filter material in compression.

25 Claims, 8 Drawing Sheets

(56) References Cited

U.S. PATENT DOCUMENTS

| | | | |
|---|---|---|---|
| 4,610,705 A * | 9/1986 | Sarnosky | B01D 39/1623 55/485 |
| 4,902,316 A | 2/1990 | Giles et al. | |
| 5,141,540 A | 8/1992 | Helmus | |
| 5,449,469 A * | 9/1995 | Burklund | A47J 37/1223 210/798 |
| 6,293,983 B1 * | 9/2001 | More | B01D 39/1615 55/486 |
| 6,712,869 B2 | 3/2004 | Cheng et al. | |
| 6,764,533 B2 * | 7/2004 | Lobiondo, Jr. | B03C 3/155 55/493 |
| 6,797,041 B2 * | 9/2004 | Brownell | B01D 50/002 55/337 |
| 6,833,022 B2 | 12/2004 | Feisthammel et al. | |
| 7,041,159 B2 | 5/2006 | Entezarian et al. | |
| 7,316,720 B2 * | 1/2008 | Cuppari | F24C 15/2021 126/299 D |
| 7,581,539 B2 | 9/2009 | Aviles | |
| 7,785,382 B2 * | 8/2010 | Morton | F24C 15/2035 55/332 |
| 8,182,588 B2 | 5/2012 | Morton | |
| 8,277,530 B2 * | 10/2012 | Alexander | B01D 39/1615 55/486 |
| 8,915,983 B2 * | 12/2014 | Broβmann | F24C 15/2035 126/299 D |
| 2003/0164093 A1 | 9/2003 | Brownell et al. | |
| 2010/0319676 A1 * | 12/2010 | Morton | F24C 15/2035 126/299 D |
| 2012/0192534 A1 * | 8/2012 | Lambertson | F24C 15/2035 55/385.1 |
| 2013/0007998 A1 | 1/2013 | Alexander et al. | |

OTHER PUBLICATIONS

Non-Final Office Action mailed Nov. 12, 2014 in U.S. Appl. No. 13/363,128, 11 pages.

www.captiveaire.com/CatalogContent/Hoods/Accessories/captrate/index.asp, retrieved on Jan. 20, 2011.

* cited by examiner

FIG. 1
-- PRIOR ART --

MULTI-STAGE HOOD FILTER SYSTEM

CROSS-REFERENCES TO RELATED APPLICATIONS

This application is a continuation-in-part of U.S. non-provisional application Ser. No. 13/363,128, filed Jan. 31, 2012, now abandoned, which claims priority to U.S. provisional Application Ser. No. 61/438,226, filed Jan. 31, 2011, the disclosure of both of which are hereby incorporated by reference in their entireties.

BACKGROUND

The present invention relates generally to exhaust hoods, and, more particularly, to multi-stage filters for use with such hoods.

In a typical restaurant kitchen, a plurality of cooking units are lined up side by side in a row under a common exhaust hood. The cooking units may include, for example, ranges, griddles, fryers, and broilers. The cooking processes performed on such equipment all produce air laden with grease, smoke, fumes, moisture, heat, and other particles in varying amounts and temperatures. The air is drawn in to the exhaust hood, where it is filtered. One known filtration system is disclosed in U.S. Pat. No. 6,394,083 to Lambertson, the disclosure of which is hereby incorporated by reference.

Commercial exhaust hoods manufactured to be installed in the U.S. must comply with certain codes and standards, such as the National Fire Protection Associates (NFPA) Standard 96. This standard requires that all hoods used in commercial cooking establishments that are installed over cooking equipment that creates effluents other than heat and steam, such as grease, during the cooking process include grease removal devices that are individually listed in accordance with Underwrites Laboratories (UL) Standard 1046, or as components of UL 710 listed hoods. This standard requires grease removal devices to be able to prevent the spread of fire from the upstream face of the filter to an area downstream of the filter.

BRIEF SUMMARY

A filtration system for a ventilation hood includes a first filter and a second filter, operatively disposed in series. The first filter is configured to be mounted within the ventilation hood, and has an air inlet, an air outlet, and a grease outlet. The second filter includes a filter material with an upstream surface and a downstream surface, an upstream housing element abutting the upstream surface of the filter material, and a downstream housing element abutting the downstream surface of the filter material. The housing elements include openings, and hold the filter material in compression.

The second filter is disposed either downstream or upstream of the first filter.

The second filter may be attached, such as removably attached, to the first filter.

The housing elements may cooperate to define a housing for the filter material. The housing may be configured to be opened to allow access to the filter material. The upstream housing element may be hingedly attached to the downstream housing element such that the upstream housing element can be hinged open from the downstream housing element to thereby open the housing. A latch may be provided, to hold the housing closed, and may be manipulable by hand to open and close the housing without requiring tools.

The ventilation hood may include a track, and the second filter may be configured to be inserted onto the hood by being moved along the track. The first filter may also be configured to be inserted onto the hood by being moved along the track.

The first filter may be a cartridge filter or a baffle filter. The filter material of the second filter may be natural fiber or synthetic fiber.

BRIEF DESCRIPTION OF THE DRAWINGS

Exemplary embodiments will be described in more detail with reference to the accompanying drawings, in which:

FIG. 2 is a schematic cross-sectional view of a first exemplary embodiment.

FIGS. 4A-4L illustrate a third exemplary embodiment, where:

FIGS. 5A-5N illustrate a fourth exemplary embodiment, where:

FIGS. 6A-6H illustrate a fifth exemplary embodiment, where:

DETAILED DESCRIPTION OF EXEMPLARY EMBODIMENTS

Exemplary embodiments of the invention provide a filtration system for a ventilation hood including a first filter, which drains grease out of the filter, and at least one second filter located either upstream or downstream of the first filter. The first filter is preferably effective at preventing the spread of fire from the upstream face of the filtration system to an area downstream of the system. The second filter includes filter material sandwiched between two perforated sheets of relatively more rigid material.

Figure 1:
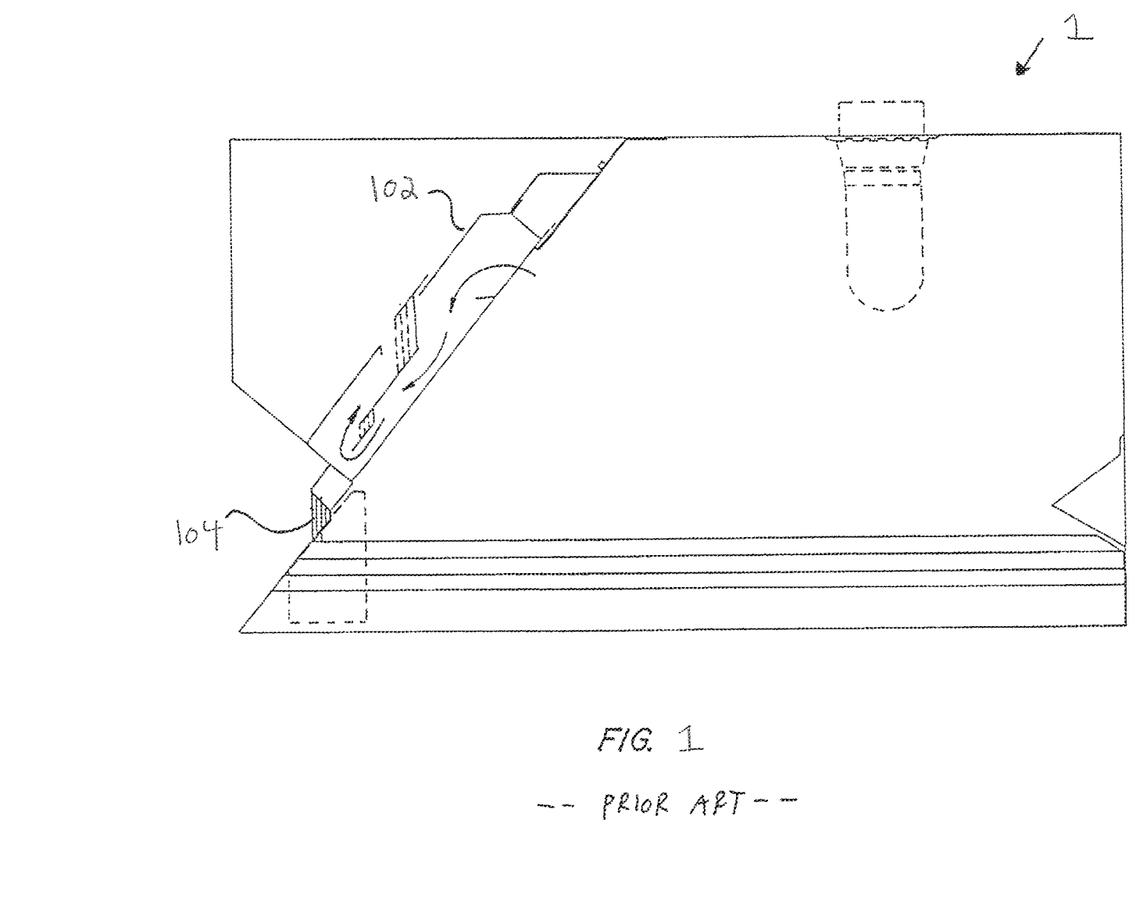
FIG. 1 is a schematic cross-sectional view of a known cartridge filter.

The first filter may be any filter that drains grease out of the filter, and is preferably also an effective fire barrier. One example of a filter for a ventilation hood that drains grease to a grease drain and is an effective fire barrier is the adjustable ventilator cartridge filter disclosed in U.S. Pat. No. 6,394,083 to Lambertson (the inventor of the present application), and shown in FIG. 1. A ventilation hood 1 is disposed above one or more cooking units (not shown). The ventilation hood 1 employs a fan (not shown) to remove the polluted air and exhaust it out of the kitchen, as generally indicated by the curved arrows. A cartridge filter 102 is disposed in the upper rear portion of the ventilator to regulate the air flow through the hood. As seen in FIG. 1, the air enters the cartridge filter 102 from one side and exits the filter on the other side in a controlled manner. It is noted that other arrangements are possible. A grease drain 104 is disposed below the cartridge filter 102. The cartridge filter 102 desirably has a substantially open and unobstructed bottom so that grease does not accumulate inside the cartridge filter 102, but flows to the grease drain 104. In the embodiment illustrated in FIG. 1, the cartridge filter 102 is inclined by about 45°, but other arrangements are possible.

The polluted air enters the filter at the topmost arrow and encounters two immediate direction changes forced by the configuration of the walls of the filter. These immediate direction changes start the segmenting of the heavier pollutants from the lighter air. The air flow then enters a high velocity corridor at the second arrow. The entire flow is sped up and then goes through a drastic turn of direction of about 180° at the third arrow. The high rate of air speed and the sudden change in direction facilitate grease extraction. The separated heavier pollutants are unable to follow the lighter air flow around the sudden change of direction at the third arrow. Thus the momentum of the grease carries it to the bottom of the cartridge filter where it impinges with the hood, and then drains into the grease trough provided in the ventilation hood.

Another example of a filter for a ventilation hood that drains grease to a grease drain and is an effective fire barrier is a baffle-type filter, such as that disclosed in U.S. Pat. No. 3,910,782 to Struble et al, the disclosure of which is hereby incorporated by reference.

Other grease-draining and fire barrier filters are within the scope of the appended claims.

The inventor of both U.S. Pat. No. 6,394,083 and the instant application has noted that the cartridge filter of U.S. Pat. No. 6,394,083 and FIG. 1 is very effective at preventing fires from traveling both from the downstream portion of the filter to the upstream portion, and vice versa, as is required by UL Standard 1046.

The grease that is filtered by the cartridge filter is drained rather than being stored inside the filter. In other words, the cartridge filter is an example of a "non-loading" filter, in that the grease does not load up within it. Therefore, if a fire enters the filter, there is very little grease inside of the filter to serve as fuel. The shape of the cartridge filter is also such that a flame cannot travel through the entire filter.

However, the filter of U.S. Pat. No. 6,394,083 and FIG. 1 is satisfactory at filtering out grease with a particle size of greater than about 5 micrometers ($\mu$m), but less effective with smaller particles.

Therefore, embodiments of the present invention further include a second disposable or permanent filter, located either upstream or downstream of the first filter, the second filter being permanently or removably attached to the first filter, or mounted within the hood separately from the first filter.

A recent change in the UL 1046 standard now allows for testing of so-called "multi-stage" filters. Materials that cannot and could not pass the fire safety requirement of the standard individually may be utilized if the filter assembly as a whole can pass the tests mandated by the standard.

Embodiments of the present invention thus provide a filtration system with both a first and a second filter, where the first filter is a very effective fire barrier, and the second filter is a very effective at entrapping particulates. The resulting combination provides superior performance in both respects.

In some embodiments, the second filter is made, in part, of fibers, such as natural, synthetic, and/or hybrid fibers, such as, for example and without limitation, wool fibers, wood-based viscose fibers, and cellulose-based synthetic fibers. In some embodiments, the second filter is made of organic material, such as natural organic material. In some embodiments, the second filter is made of animal-derived organic material, such as wool.

Other filter materials are within the scope of the appended claims.

The material of the second filter is sandwiched between two perforated sheets of relatively more rigid material. While fiber filters are prized for their particle filtration abilities, their consistency is similar to that of paper towels, and they are known to collapse during use, particularly with age. For this reason, they are not used as often as might be expected given their excellent filtration properties. The present inventor has discovered that by sandwiching the fiber material between two perforated sheets, the problems caused by the consistency can be rectified. In a presently preferred embodiment, the two sheets are placed very close together to squeeze and hold the material between them. In this way, the material remains in place, regardless of how much grease and other particulates it has absorbed.

Figure 4:
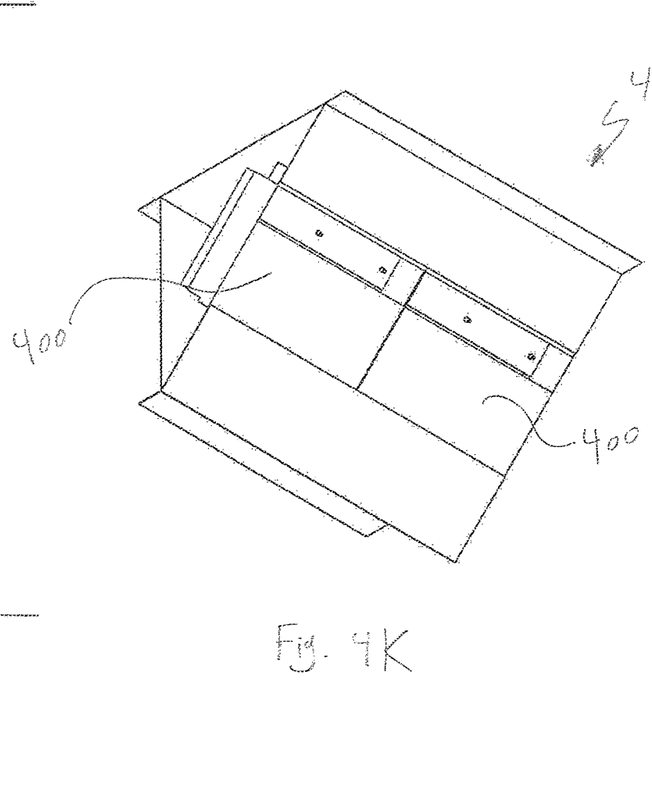
FIGS. 4A, 4B, and 4C are isometric views of a filter assembly in the closed, open, and filter material removed states, respectively.
FIG. 4D is an isometric view of the filter assembly of FIGS. 4A-4C as viewed from the other side.
FIGS. 4E and 4F are a top and rear view, respectively, of the filter assembly of FIGS. 4A-4D.
FIGS. 4G, 4H, and 4I schematically illustrate removal of the second filter from the filter assembly of FIGS. 4A-4F.
FIG. 4J is a cross-sectional view of the filter assembly of FIGS. 4A-4I mounted within a hood.
FIG. 4K is a bottom plan view thereof, looking up at the hood from underneath.
FIG. 4L schematically illustrates the filter assembly of FIGS. 4A-4K mounted in a hood above an item of cooking equipment.

As was mentioned above, the second filter can be placed either upstream or downstream of the first filter. There are three presently preferred configurations: first, the second filter is downstream of the first filter. This configuration is similar to that discussed in the parent application and particularly in the embodiments of FIGS. 2 and 4 therein. Second, the second filter is disposed upstream of the first filter, by being retrofit into an existing hood that already includes a first filter but not a second filter. And third, the second filter is disposed upstream of the first filter, where both filters are retrofit into an existing hood that does not yet include any filters.

FIG. 2 shows a first example of the second filter being disposed downstream of the first filter. This embodiment is similar to that illustrated in FIG. 2 in the parent application. In this embodiment, the first filter is a cartridge filter 202 with associated pitched grease tray 203 and grease drain 204, and the second filter is a fiber, organic, or other filter 206 located downstream of the first filter 202. The second filter 206 is mounted to the first filter 202 at its downstream end, between the air outlet of the first filter and the air outlet of the ventilation hood 2. The second filter may be permanently or removably attached to the first filter, or merely installed in the hood separately.

Also illustrated in FIG. 2 are two sheets of perforated material 208, 210, such as metal, one immediately upstream of the fiber filter material 206 and one immediately downstream of the filter material 206. These sheets may each have a cross-section substantially identical in shape and size to the filter material 206, to act as a backing for the filter and sandwich it therebetween. They may be approximately 0.5 mm thick and made, for example, of stainless steel. The perforations may take any number or configuration that can be selected by a person of ordinary skill in the art based on the teachings herein, and may take up, for example, approximately 60% of the total cross-sectional area of the sheet. The percent open of each perforated sheet can be selected so as to enable efficient flow resistance behavior for the multi-stage filter system, to allow for enhanced grease capture while not adversely impacting the flow resistance of the multi-stage filter system. Alternatively, the perforated sheets can be made of expanded metal, wire screen or mesh, or any other supporting material—preferably non-flammable—that can be selected by a person of ordinary skill in the art based on the teachings herein.

In some embodiments, these perforated sheets provide resistance to the greasy air flowing through the filter material 206, creating an additional static pressure drop across the filter 206. This distributes the air flow more evenly throughout the filter, thus improving the particle extraction efficiency.

In use, polluted air enters the first filter 202, where it is first filtered, and the less-polluted air then enters the second filter 206 with an increased static pressure, and is further filtered there. The clean air then flows through the downstream perforated sheet 210 and exits the ventilation hood 2.

Figure 3:
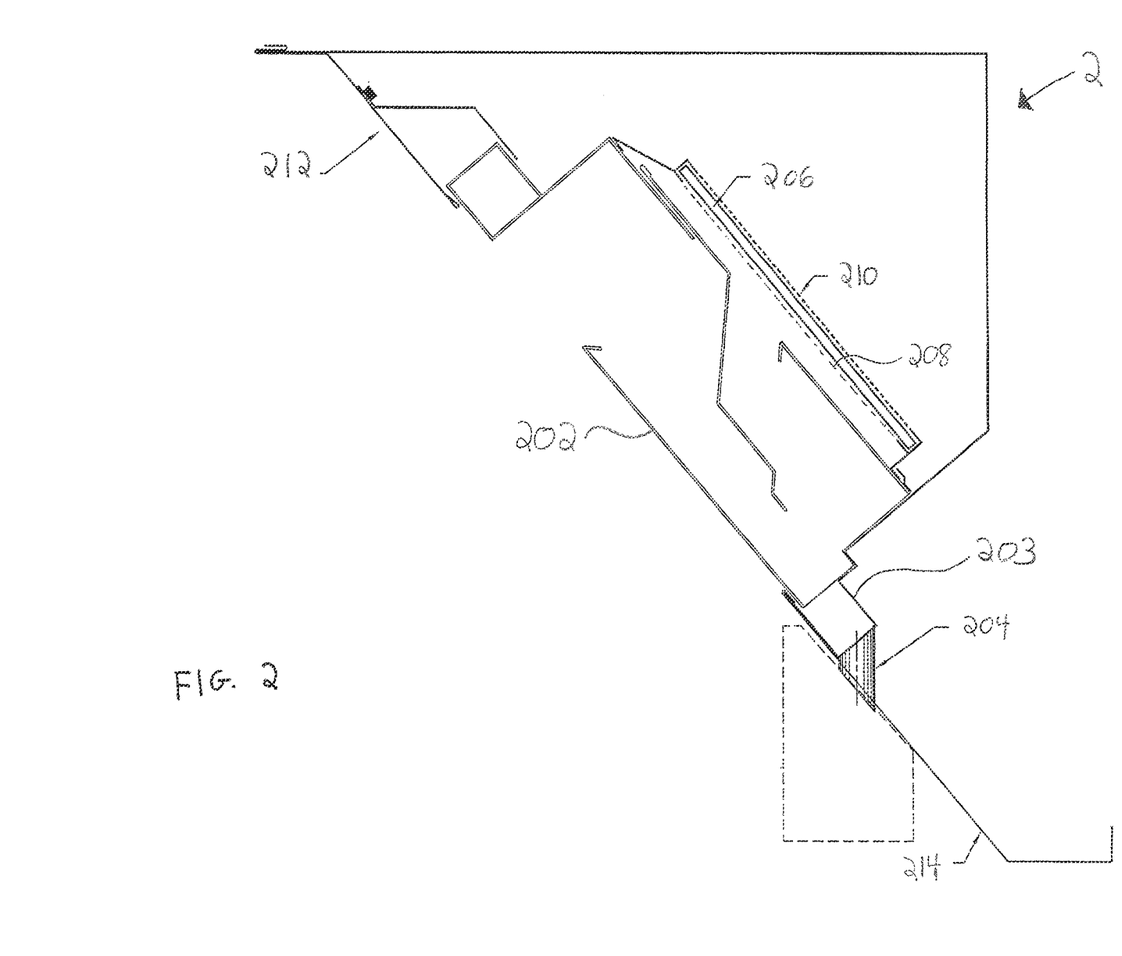
FIG. 3 is a schematic cross-sectional view of a second exemplary embodiment.

FIG. 3 shows a second example of the second filter being disposed downstream of the first filter. This embodiment is similar to that illustrated in FIG. 4 in the parent application. This differs from the embodiment seen in FIG. 2 of this application in that the first filter is a baffle filter 302 rather than a cartridge filter 202. The second filter 306 is again a fiber, organic, or other filter with associated perforated sheets 308, 310. The second filter 306 is mounted within the ventilation hood 3 downstream of the first filter 302, between the air outlet of the first filter and the air outlet of the ventilation hood. As discussed above, the second filter may be permanently or removably attached to the first filter, or installed in the hood separately.

Other embodiments provide the second filter upstream of the first filter. These embodiments are considered particularly suitable when retrofitting an existing hood. Most hoods, whether with or without first filters, have tracks near the upstream end of the hood. (See 212 and 214 in FIG. 2, and 312 and 314 in FIG. 3.) The present inventor has discovered that these tracks can be used as rails on which to position a filter assembly: either only a second filter (filter material plus perforated sheets) or for hoods that have no filters yet, a second filter integrated with a first filter can be inserted onto the hood and slid on the tracks provided in the hood. The filter assembly can alternatively be attached to the hood by any other appropriate means.

Figures 4A, 4J:
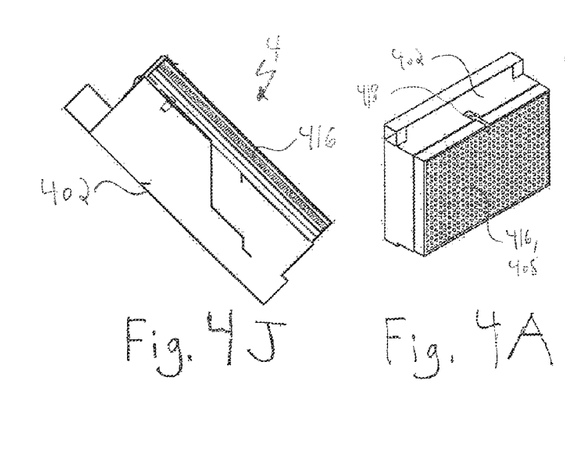
Figure 4B:
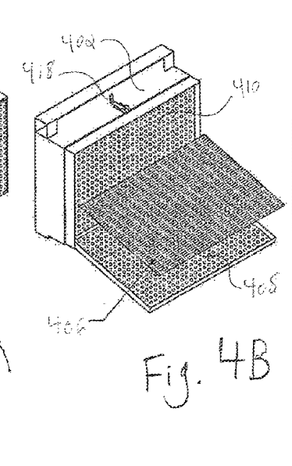
Figure 4C:
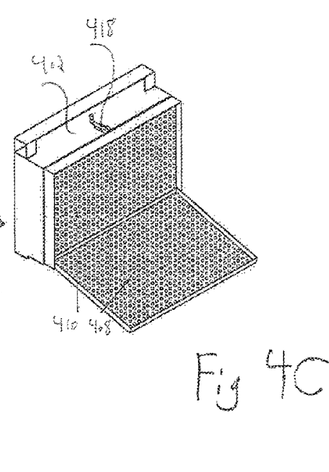
Figure 4D:
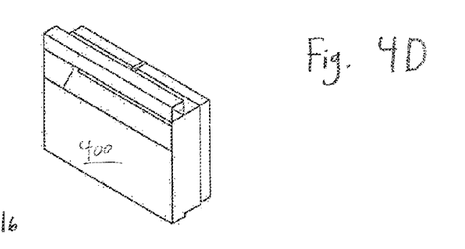
Figures 4E, 4F, 4G, 4H:
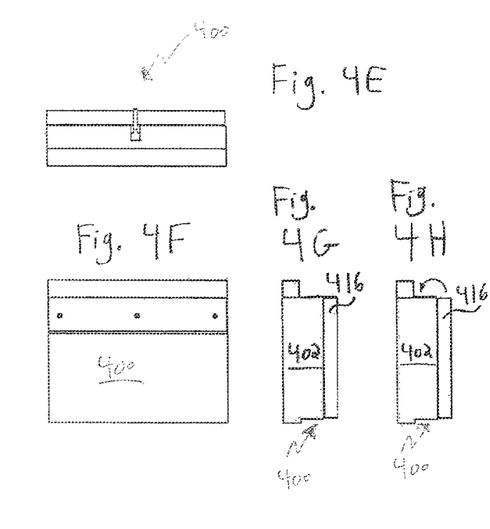
Figure 4I:
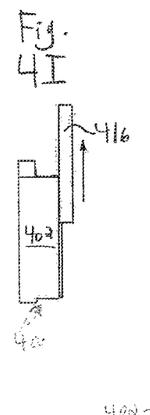

FIGS. 4A-4L show a second filter 416 integrated with a cartridge filter 402, to provide a filter assembly 400 that can be slid into an existing hood 4 that does not yet have a filter. As can be seen, the first and second filters are removable from one another by the pivoting motion shown in FIG. 4H or the sliding motion shown in FIG. 4I. The filter material 406 can be removed from between the perforated sheets 408, 410 even when the second filter 416 is attached to the first filter 402, as can be seen in FIGS. 4A-4C. A latch or clamp 418 keeps the filter material 406 interior the perforated sheets 408, 410 during use. This latch 418 can be undone by hand, and the upstream perforated sheet 408 can be swung open on hinges to provide access to the fiber material 406 for cleaning or replacement.

FIG. 4L shows the assembly 400 mounted in a hood 4 over cooking equipment 420. A stove 420 is illustrated for exemplary purposes.

Figure 5:
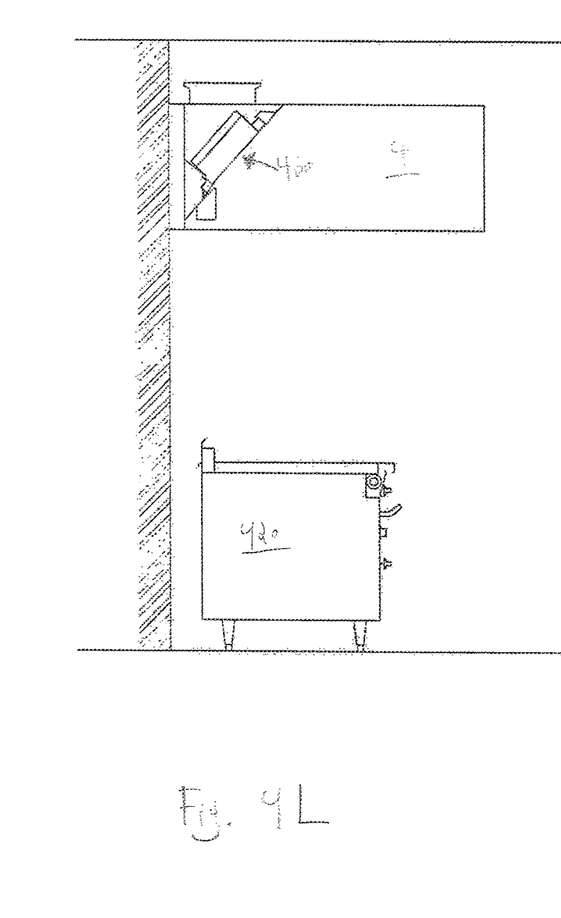
FIGS. 5A, 5B, and 5C are isometric views of a filter assembly in the closed, open, and filter material removed states, respectively.
FIG. 5D schematically illustrates removal of the first filter from the filter assembly of FIGS. 5A-5C.
FIGS. 5E and 5F are side views of the second filter of FIGS. 5A-5D, illustrating the closed and open states, respectively.
FIGS. 5G, 5H, and 5I are a rear, front, and top view, respectively, of the filter assembly of FIGS. 5A-5F.
FIGS. 5J and 5K are cross-sectional views of the filter assembly of FIGS. 5A-5I mounted within a hood, with the second filter in the closed and open states, respectively.
FIGS. 5L and 5M are bottom plan views thereof, looking up at the hood from underneath, with the lefthand second filter in the closed and open states, respectively.
FIG. 5N schematically illustrates the filter assembly of FIGS. 5A-5M mounted in a hood above an item of cooking equipment.
Figures 5A, 5B, 5E, 5G, 5H, 5I:
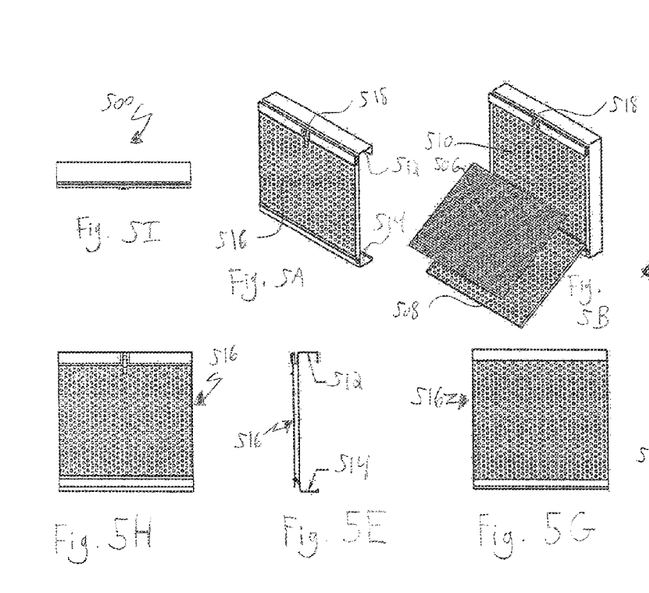
Figures 5C, 5D, 5F:
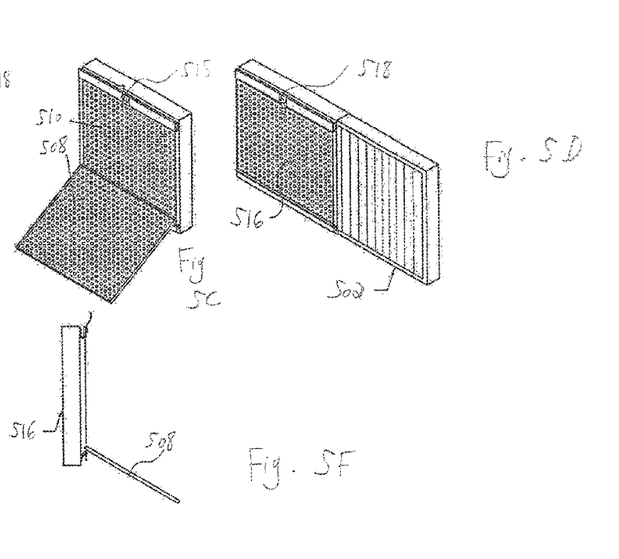
Figure 5J:
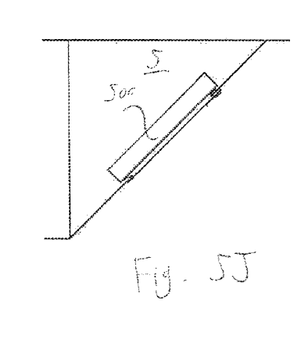
Figures 5K, 5M:
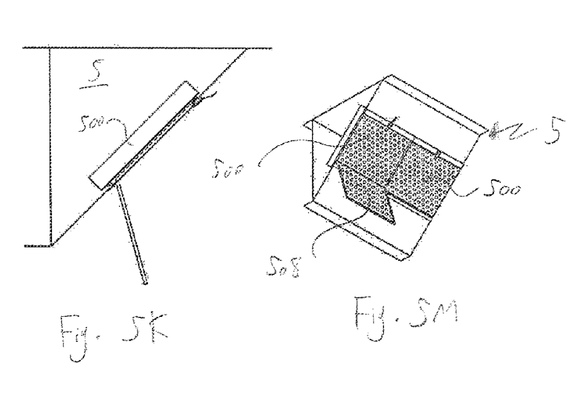
Figure 5L:
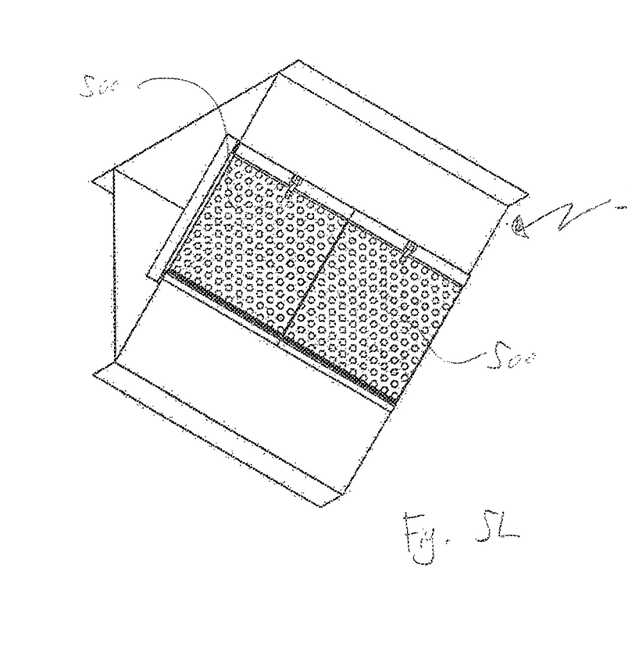
Figure 5M:
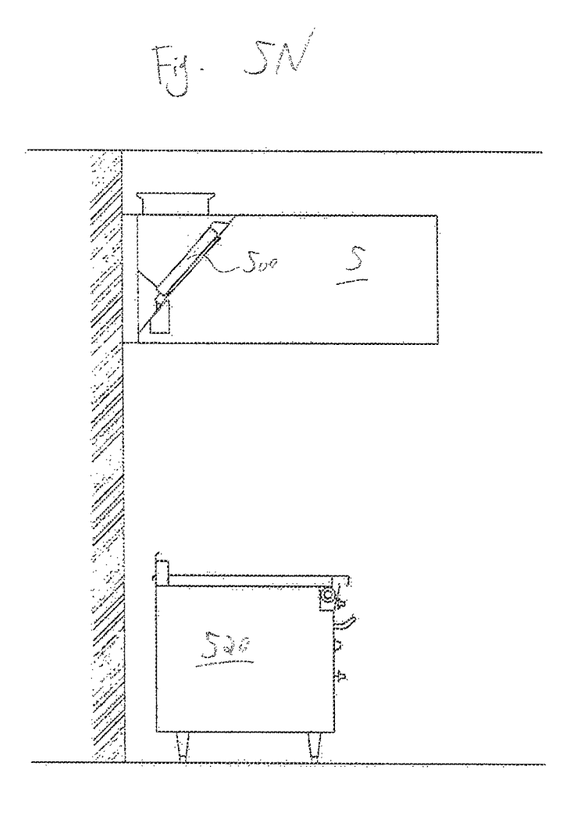
Figures 6A, 6B, 6C, 6D, 6E, 6F, 6G, 6H:
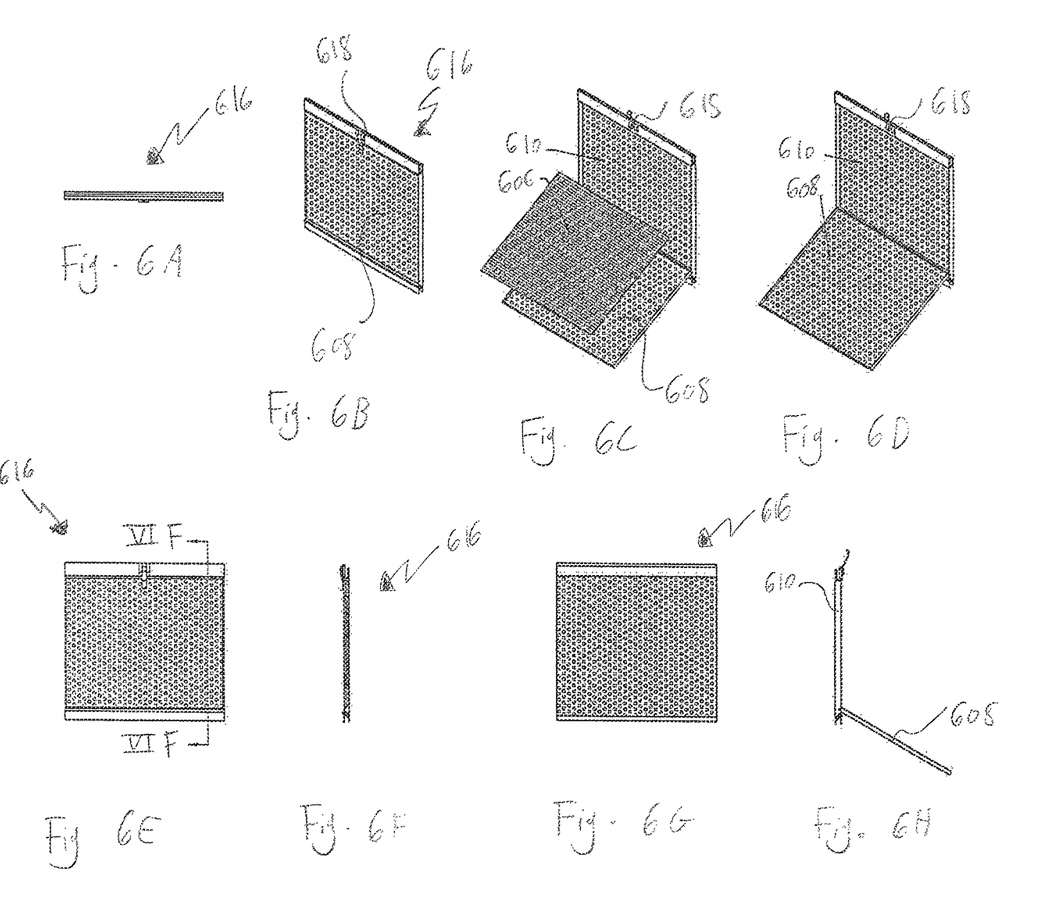
FIG. 6A is a top view of a filter assembly.
FIGS. 6B, 6C, and 6D are isometric views of the filter assembly of FIG. 6A in the closed, open, and filter material removed states, respectively.
FIG. 6E is a front view of the filter assembly of FIGS. 6A-6D.
FIG. 6F is a cross-sectional view taken along line VIF-VIF in FIG. 6E.
FIG. 6G is a rear view of the filter assembly of FIGS. 6A-6F.
FIG. 6H is a side view of the filter assembly of FIG. 6A-6G in the open state.

FIG. 5A-5N show a configuration in which the assembly 500 includes a baffle filter 502, rather than a cartridge filter 402, provided as the first filter. In this configuration, the baffle filter 502 can be slid into a track 512, 514 provided on a frame attached to the second filter 516 from the side. The second filter 516 includes filter material 506 sandwiched between perforated sheets 508, 510. A latch 518 keeps the material 506 interior the sheets 508, 510 during use. FIGS. 5J-5N show the assembly mounted in a hood 5 that did not previously have a filter. FIG. 5N shows the hood 5 over cooking equipment 520; a stove 520 is illustrated for exemplary purposes.

FIGS. 6A-6H show a standalone second filter 616 for attachment into a hood (not shown) that already has a first filter (such as a cartridge or baffle filter). This second filter 616 can be inserted as a standalone add-on item, such as by being inserted into the track of the hood to provide additional filtering capabilities. The filter assembly 616 includes filter material 606 sandwiched between perforated sheets 608, 610. The filter assembly 616 also includes a latch 618 to keep the material 606 interior to the sheets 608, 610 during use.

As will be understood by those skilled in the art, the present invention may be embodied in other specific forms without departing from the essential characteristics thereof. Many other embodiments are possible without deviating from the spirit and scope of the invention. These other embodiments are intended to be included within the scope of the present invention, which is set forth in the following claims.

What is claimed is:

1. A filtration system for a ventilation hood, comprising:
   a first filter configured to be mounted within the ventilation hood, comprising an air inlet, an air outlet, and a grease outlet, the first filter being configured to drain grease through the grease outlet; and
   a second filter configured to be mounted within the ventilation hood, operatively disposed in series with the first filter, wherein the second filter comprises:
      a filter material comprising an upstream surface and a downstream surface;
      an upstream housing element abutting the upstream surface of the filter material and comprising first openings; and
      a downstream housing element abutting the downstream surface of the filter material and comprising second openings;

wherein at least one of the upstream housing element and the downstream housing element is formed of a perforated sheet, wherein the perforated sheet is about 0.5 mm thick, and wherein the perforations of the perforated sheet cover about 60% of the surface area of the perforated sheet, wherein the upstream housing element and the downstream housing element cooperate to define a housing for the filter material, and wherein the housing elements hold the filter material in compression.

2. The filtration system of claim 1, wherein the second filter is disposed downstream of the first filter.

3. The filtration system of claim 1, wherein the second filter is disposed upstream of the first filter.

4. The filtration system of claim 1, wherein the second filter is attached to the first filter.

5. The filtration system of claim 4, wherein the second filter is removably attached to the first filter.

6. The filtration system of claim 1, wherein the housing is configured to be opened to provide access to the filter material.

7. The filtration system of claim 6, wherein the upstream housing element is hingedly attached to the downstream housing element and is configured to be hinged open from the downstream housing element to thereby open the housing.

8. The filtration system of claim 6, further comprising a latch configured to hold the housing in a closed configuration.

9. The filtration system of claim 8, wherein the latch is readily manipulable by hand to open and close the housing without requiring tools.

10. The filtration system of claim 1, wherein the ventilation hood comprises a track, and wherein the second filter is configured to be inserted onto the hood by being moved along the track.

11. The filtration system of claim 10, wherein the first filter and the second filter are configured to be inserted onto the hood by being moved along the track.

12. The filtration system of claim 1, wherein the first filter comprises a cartridge filter.

13. The filtration system of claim 1, wherein the first filter comprises a baffle filter.

14. The filtration system of claim 1, wherein the filter material comprises natural fiber or synthetic fiber.

15. A filter, comprising:
a filter material comprising a first surface and a second surface;
a first housing element abutting the first surface of the filter material; and
a second housing element abutting the second surface of the filter material;
wherein the housing elements are formed of stainless steel and hold the filter material in compression, wherein at least one of the first housing element and the second housing element is formed of a perforated sheet, wherein the perforated sheet is about 0.5 mm thick, and wherein the perforations of the perforated sheet cover about 60% of the surface area of the perforated sheet.

16. The filter of claim 15, wherein the housing elements cooperate with one another to define a housing for the filter material.

17. The filter of claim 16, wherein the housing is configured to be opened to provide access to the filter material.

18. The filter of claim 17, wherein the first housing element is hingedly attached to the second housing element and is configured to be hinged open from the second housing element to thereby open the housing.

19. The filter of claim 17, further comprising a latch configured to hold the housing in a closed configuration.

20. The filter of claim 19, wherein the latch is readily manipulable by hand to open and close the housing without requiring tools.

21. The filter of claim 15, further comprising an additional filter attached to the filter.

22. The filter of claim 15, wherein the filter material comprises natural fiber or synthetic fiber.

23. The filtration system of claim 1, wherein the first filter and the second filter are mechanically integrated to form a filter assembly, wherein the first filter and the second filter are positioned at a distance separated from each other, the filter assembly being configured to be mounted within the ventilation hood.

24. The filtration system of claim 1, wherein both of the upstream housing element and the downstream housing element are formed of a perforated sheet.

25. The filter of claim 15, wherein both of the first housing element and the second housing element are each formed from a perforated sheet.

* * * * *